US012624310B2

(12) United States Patent
Baranyi et al.

(10) Patent No.: US 12,624,310 B2
(45) Date of Patent: May 12, 2026

(54) ACIDIC HARD SURFACE CLEANING COMPOSITION

(71) Applicant: The Procter & Gamble Company, Cincinnati, OH (US)

(72) Inventors: Blanka Baranyi, Ixelles (BE); Giulia Moggia, Brussels (BE); Kim Tastenhoye, Hoeilaart (BE)

(73) Assignee: The Procter & Gamble Company, Cincinnati, OH (US)

( * ) Notice: Subject to any disclaimer, the term of this patent is extended or adjusted under 35 U.S.C. 154(b) by 284 days.

(21) Appl. No.: 18/340,945

(22) Filed: Jun. 26, 2023

(65) Prior Publication Data

US 2023/0416642 A1 Dec. 28, 2023

(30) Foreign Application Priority Data

Jun. 27, 2022 (EP) .................................... 22181221

(51) Int. Cl.

| | |
|---|---|
| ***C11D 1/72*** | (2006.01) |
| ***B08B 3/04*** | (2006.01) |
| ***C11D 1/66*** | (2006.01) |
| ***C11D 1/722*** | (2006.01) |
| ***C11D 1/825*** | (2006.01) |
| ***C11D 3/20*** | (2006.01) |
| ***C11D 3/22*** | (2006.01) |
| ***C11D 3/48*** | (2006.01) |
| ***C11D 3/50*** | (2006.01) |

(52) U.S. Cl.

CPC .............. *C11D 1/662* (2013.01); *C11D 1/722* (2013.01); *C11D 3/2082* (2013.01); *C11D 3/48* (2013.01); *C11D 3/50* (2013.01); *C11D 2111/14* (2024.01)

(58) Field of Classification Search

CPC ........... C11D 1/662; C11D 1/72; C11D 1/825; C11D 3/2086; C11D 3/22; C11D 3/48; C11D 3/50; C11D 11/0023; B08B 3/04

See application file for complete search history.

(56) References Cited

U.S. PATENT DOCUMENTS

| | | | | |
|---|---|---|---|---|
| 5,780,416 | A | 7/1998 | Kiewert et al. | |
| 6,869,923 | B1 | 3/2005 | Cunningham | |
| 11,339,352 | B2 | 5/2022 | Ceulemans et al. | |
| 2002/0175092 | A1 | 11/2002 | Stulens et al. | |
| 2004/0180022 | A1 | 9/2004 | Denzligil | |
| 2004/0266652 | A1 | 12/2004 | Brown et al. | |
| 2017/0022458 | A1 | 1/2017 | Trujillo et al. | |
| 2019/0330564 | A1* | 10/2019 | Ceulemans | C11D 1/86 |
| 2019/0330566 | A1 | 10/2019 | Ceulemans et al. | |
| 2019/0330568 | A1* | 10/2019 | Ceulemans | C11D 1/83 |
| 2020/0140790 | A1 | 5/2020 | Balliet et al. | |
| 2021/0029998 | A1* | 2/2021 | Konya | C11D 3/30 |
| 2022/0056370 | A1 | 2/2022 | Falk et al. | |

FOREIGN PATENT DOCUMENTS

| | | | | |
|---|---|---|---|---|
| EP | 1434837 | * | 3/2006 | C11D 1/72 |
| EP | 1434837 | B1 | 3/2006 | |
| JP | 2005029755 | A | 2/2005 | |

OTHER PUBLICATIONS

All Office Actions; U.S. Appl. No. 18/340,949, filed Jun. 26, 2023.

All Office Actions; U.S. Appl. No. 18/340,956, filed Jun. 26, 2023.

Extended EP Search Report and Opinion for 22181221.7 dated Dec. 5, 2022, 9 pages.

U.S. Appl. No. 18/340,949, filed Jun. 26, 2023, to Jean-Francois Bodet et al.

U.S. Appl. No. 18/340,956, filed Jun. 26, 2023, to Marina Jozefa Hermie et al.

* cited by examiner

*Primary Examiner* — Brian P Mruk

(74) *Attorney, Agent, or Firm* — Gary J. Foose

(57) ABSTRACT

An acidic hard surface cleaning composition includes a surfactant system, a perfume, and water. The surfactant system includes a primary surfactant comprising an alkyl polyglycoside and a secondary surfactant. The primary and secondary surfactant are present in a weight ratio of at least about 3:1. The perfume and the surfactant system are present in a weight ratio of at least about 1:10, and the composition has a pH of from about 2 to about 6 as measured at 20° C.

10 Claims, No Drawings

ACIDIC HARD SURFACE CLEANING COMPOSITION

TECHNICAL FIELD

The present disclosure relates to a treating composition, in particular it relates to a hard surface cleaning composition, comprising an alkyl polyglycoside, a secondary surfactant, and a perfume and a method of using the composition to clean hard surfaces.

BACKGROUND

It has been evidenced by consumer studies that the low-energy, everyday cleaning (quick cleaning) has a much more positive impact on consumer acceptance over the heavy duty, one-time-per-week cleaning (deep cleaning). In fact, it is much easier to clean bathroom surfaces right after they have been used (soft dirt, low level), rather than wait until dirt accumulates (hard dirt, high level). The objective of the present disclosure is to find a composition that provides light cleaning and a good finishing (i.e., good shine and pleasant odor) whose use prevents the accumulation of dirt in the bathroom (soap scum, limescale, dust, skin residues, toothbrush marks, etc). A typical hard surface cleaning procedure (deep cleaning) comprises application of the product, scrubbing with an implement, rinsing and drying. A further objective of this disclosure is to provide a composition that facilitates the cleaning process by reducing the "cleaning steps". A process involving "spray, wipe and let it dry" would be very appealing to consumers. Another objective of the disclosure is to find a composition that is stable even at low temperatures.

SUMMARY

According to the first aspect of the disclosure, there is provided a hard surface cleaning composition. The composition comprises a surfactant system comprising an alkyl polyglycoside and a secondary surfactant in a high weight ratio. The composition also comprises a high level of perfume. The composition has a pH of from about 2 to about 6 as measured at 20° C.

The composition according to the disclosure is very well suited for light cleaning, especially light cleaning of bathrooms. The composition may provide good shine to a surface without significant effort and may also provide a pleasant olfactory experience while using it. The composition seems to be stable even at low temperatures. The composition can be a concentrate composition that requires to be diluted before use, or it can be in ready-to-use form. Preferably, the composition is provided in a spray bottle.

According to the second aspect of the disclosure, there is provided a method of cleaning a hard surface, preferably a bathroom surface, using the composition of the disclosure. The method involves treating the surface, preferably a bathroom surface, with the composition of the disclosure and then wiping the surface, without needing to rinse the surface prior to wiping. This makes the cleaning process very easy. The cleaning process provided by the method of the disclosure is well suited for light cleaning, it is well suited to be used often and it does not involve hard scrubbing from the user.

According to the third aspect of the disclosure, there is provided the use of the method of the disclosure to provide shine and good finishing of the treated surface.

The elements of the composition of the disclosure described in relation to the first aspect of the disclosure apply mutatis mutandis to the other aspects of the disclosure.

DETAILED DESCRIPTION

The present disclosure is directed to an acidic composition comprising a surfactant system and a high level of perfume. The composition provides good cleaning and good shine even if the composition is just sprayed and wiped, even without rinsing. The composition is also stable.

The composition also comprises a high level of perfume. The perfume and the surfactant system are present in a weight ratio of at least 1:10. Preferably, the perfume and the surfactant are present in a weight ratio of from 1:9 to 1:3.

As defined herein, "essentially free of" a component means that no amount of that component is deliberately incorporated into the respective premix, or composition. Preferably, "essentially free of" a component means that no amount of that component is present in the respective premix, or composition.

As used herein, "isotropic" means a clear mixture, having little or no visible haziness, phase separation and/or dispersed particles, and having a uniform transparent appearance.

As defined herein, "physically stable" means that no visible phase separation is observed for a composition kept at 50° C. for a period of 10 days and 5° C. for a period of 10 days.

All percentages, ratios and proportions used herein are by weight percent of the composition, unless otherwise specified. All average values are calculated "by weight" of the composition, unless otherwise expressly indicated.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Composition

The composition is a hard surface cleaning composition and most preferable an aqueous hard surface cleaning composition.

By "aqueous hard surface cleaning composition", it is meant herein a water based liquid composition for cleaning hard surfaces found in households, especially domestic households.

The composition herein is an aqueous acidic composition. By "aqueous composition" is herein meant a composition comprising more than 50%, preferably more than 60% by weight of the composition of water. The composition may comprise from 80% to 99.5%, preferably from 85% to 99% and more preferably from 94% to 98% by weight of the total composition of water.

Surfactant System

The present disclosure encompasses a composition comprising a surfactant system. The surfactant system comprises a primary and a secondary surfactant. The primary surfactant comprises alkylpolyglycoside, preferably an alkyl polyglucoside. The secondary surfactant preferably comprises an ethoxylated alcohol. The primary surfactant and the secondary surfactant are present in a weight ratio of at least 3:1, preferably at least 4:1, more preferably the weight ratio of primary to secondary surfactant is from 3:1 to 8:1.

Alkyl Polyglycoside Surfactant

The composition of the disclosure comprises an alkyl polyglycoside (APG). Preferred APGs include alkyl polyglucosides, which are characterized by the saccharide moiety being glucose. Preferred alkyl polyglucosides have naturally derived glucoside groups.

The alkyl polyglycosides, which can be used in the present disclosure, are fatty ether derivatives of saccharides or polysaccharides which are formed when a carbohydrate is reacted under acidic condition with a fatty alcohol through condensation polymerization. The APGs commonly are derived from corn-based carbohydrates and fatty alcohols from natural oils in animals, coconuts and palm kernels. Natural gas, or petroleum-based alcohols may also be used, particularly in shorter chain lengths. Such methods of deriving APGs are known in the art, for example, U.S. Pat. No. 5,003,057.

The alkyl polyglycoside that can be used in the present disclosure contains a hydrophilic group derived from carbohydrates and is composed of one or more anhydroglucose. Each of the glucose units can have two ether oxygens and three hydroxyl groups and a terminal hydroxyl group, imparting water solubility to the glycoside. The presence of the alkyl carbons leads to the hydrophobic activity. When carbohydrate molecules react with fatty alcohol molecules, alkyl poly glycoside molecules are formed with single or multiple anhydroglucose units, which are termed monoglycosides and polyglycosides, respectively. The final alkyl poly glycoside product typically has a distribution of varying concentration of glucose units (or degree of polymerization).

The APG used in the composition of the present disclosure preferably comprises the saccharide or polysaccharide groups (i.e., mono-, di-, tri-, etc. saccharides) of hexose or pentose, and a fatty aliphatic group with 6 to 20 carbon atoms. Alkyl polyglycosides which can be used in the present disclosure are represented by the general formula of $$(G)_{x\text{-}O\text{—}R}$$

where G is a moiety derived from a reducing saccharide containing 5 or 6 carbon atoms, e.g., pentose or hexose; R is fatty aliphatic group containing 6 to 20 carbon atoms; and x is the degree of polymerization (D.P.) of the polyglycoside, representing the number of monosaccharide repeating units in the polyglycoside. Generally, x is an integer on the basis of individual molecules, but because there are statistical variations in the manufacturing process of the APG, x may be a non-integer on an average basis when referred to APG used as an ingredient for composition of the present disclosure. In suitable APGs for use herein, x preferably has a value of less than about 5, and more preferably between about 0.5 and about 5. Even more preferably, x is less than about 2.5, and more preferably is within the range between about 1 and about 2.

Many commercially available alkyl polyglycosides may contain a blend of carbon lengths. Suitable alkyl polyglycosides include alkyl polyglycosides containing short chain carbons, such as chain lengths of less than C16. In one example, suitable alkyl polyglycosides include C8-C16 alkyl polyglycosides. Additional description of suitable alkyl polyglycosides are set forth, for example, in U.S. Pat. Nos. 8,287,659 and 8,299,009, and U.S. patent application Ser. Nos. 12/819,667, 12/884,638, 12/887,716, 13/597,380, 13/622,392, and 13/653,965.

Exemplary saccharides from which G is derived are glucose, fructose, mannose, galactose, talose, gulose, allose, altrose, idose, arabinose, xylose, lyxose and ribose. Because of the ready availability of glucose, glucose is preferred in the making of polyglycosides. The fatty aliphatic group, which is the substituent of the preferred polyglycoside, is preferably saturated, although unsaturated fatty group may be used.

In some embodiments, the APGs have an average degree of polymerization of saccharides from 1.4 to 1.7 and the chain lengths of the aliphatic groups are between C8-16. Alkyl polyglycosides suitable for this disclosure can be described as illustrated in the following way: "C8-16 G 1.6" denotes a polyglycoside with an alkyl chain of 8 to 16 carbon atoms and an average degree of polymerization of 1.6 anhydroglucose units in the alkyl polyglucoside molecule. Commercially, alkyl polyglycosides can be provided as concentrated, aqueous solutions ranging from 50 to 70 wt. % active. Examples of suitable alkyl polyglucoside surfactants are the TRITON™ alkyl polyglucosides from Dow; Agnique PG, Disponil APG and Glucopon alkyl polyglucosides from BASF. Preferred alkyl polyglucoside surfactants are those where n is 8 to 12, more preferably 8 to 10. Examples of preferred polyglycosides include AG 6202, 2-ethylhexyl APG from Nouryon, Triton CG-50, C8-10 APG with low degree of glucose oligomerization from Dow, Triton GC-110, C8-10 APG with high degree of glucose oligomerization from Dow.

Preferably, the composition of the disclosure comprises from about 0.2 to about 5%, preferably from about 0.5 to about 2% by weight of the composition of APG, preferably from about 0.5 to about 2% by weight of the composition of alkyl polyglucoside. A C8-10 alkyl polyglucoside is specially preferred for use herein.

Secondary Surfactant

Secondary surfactants for use herein include non-ionic surfactants other than APG, in particular alkoxylated nonionic surfactants. Alkoxylated nonionic surfactants include primary $C_6$-$C_{16}$ alcohol polyglycol ether i.e. ethoxylated alcohols having 6 to 16 carbon atoms in the alkyl moiety and 4 to 30 ethylene oxide (EO) units. When referred to for example $C_{9\text{-}14}$ it is meant average carbons and alternative reference to for example E08 is meant average ethylene oxide units.

- Suitable alkoxylated nonionic surfactants are according to the formula RO-$(A)_n$H, wherein: R is a $C_6$ to $C_{18}$, preferably a $C_8$ to $C_{16}$, more preferably a $C_8$ to $C_{12}$ alkyl chain, or a $C_6$ to $C_{28}$ alkyl benzene chain; A is an ethoxy or propoxy or butoxy unit, and wherein n is from 1 to 30, preferably from 1 to 20 and, more preferably from 5 to 16 even more preferably from 7 to 12. Preferred R chains of use herein are the Ca to $C_{22}$ alkyl chains. Even more preferred R chains of use herein are the $C_{12}$ to $C_{14}$ alkyl chains. R can be linear or branched alkyl chain.
- Suitable ethoxylated nonionic surfactants of use herein are Dobanol® 91-2.5 (HLB=8.1; R is a mixture of $C_9$ and $C_{11}$ alkyl chains, n is 2.5), Dobanol® 91-10 (HLB=14.2; R is a mixture of $C_9$ to $C_{11}$ alkyl chains, n is 10), Dobanol® 91-12 (HLB=14.5; R is a mixture of $C_9$ to $C_{11}$ alkyl chains, n is 12), Greenbentine DE/080 (HLB=13.8, 98 wt % C10 linear alkyl chain, n is 8), Marlipal 10-8 (HLB=13.8, R is a C10 linear alkyl chain, n is 8), Lialet® 11-5 (R is a $C_{11}$ alkyl chain, n is 5), Isalchem® 11-5 (R is a mixture of linear and branched C11 alkyl chain, n is 5), Lialet® 11-21 (R is a mixture of linear and branched $C_{11}$ alkyl chain, n is 21), Isalchem® 11-21 (R is a $C_{11}$ branched alkyl chain, n is 21), Empilan® KBE21 (R is a mixture of $C_{12}$ and $C_{14}$ alkyl chains, n is 21) or mixtures thereof. Preferred herein are Dobanol® 91-5, Neodol® 11-5, Lialet® 11-21 Lialet® 11-5 Isalchem® 11-5 Isalchem® 11-21 Dobanol® 91-8, or Dobanol® 91-10, or Dobanol® 91-12, or mixtures thereof. These Dobanol®/Neodol® surfactants are commercially available from SHELL. These Lutensol® surfactants are commercially available from BASF and these Tergitol® surfactants are commercially available from Dow Chemicals.

Suitable chemical processes for preparing the alkoxylated nonionic surfactants of use herein include condensation of corresponding alcohols with alkylene oxide, in the desired proportions. Such processes are well known to the person skilled in the art and have been extensively described in the art, including the OXO process and various derivatives thereof. Suitable alkoxylated fatty alcohol nonionic surfactants, produced using the OXO process, have been marketed under the tradename NEODOL® by the Shell Chemical Company. Alternatively, suitable alkoxylated nonionic surfactants can be prepared by other processes such as the Ziegler process, in addition to derivatives of the OXO or Ziegler processes.

Preferably, said alkoxylated nonionic surfactant is a $C_{9-11}$ EO5 alkylethoxylate, $C_{12}$-14 EO5 alkylethoxylate, a $C_{11}$ EO5 alkylethoxylate, $C_{12-14}$ EO21 alkylethoxylate, or a $C_{9-11}$ EO8 alkylethoxylate or a mixture thereof. Most preferably, said alkoxylated nonionic surfactant is a C ii EO5 alkylethoxylate or a $C_{9-11}$ EO8 alkylethoxylate or a mixture thereof.

The composition can comprise from 0.5% to 2%, preferably from 0.08% to 0.5% by weight of the composition of alkoxylated nonionic surfactant, preferably from 0.08% to 0.5% by weight of the composition of ethoxylated alcohol.

Additional Surfactant:

The hard surface cleaning composition may comprise up to 1% by weight of an additional surfactant, preferably selected from: anionic, amphoteric, zwitterionic, and mixtures thereof. The hard surface cleaning composition can comprise from 0.01% to 1% by weight of the additional surfactant. Preferably, the composition of the disclosure is substantially free of surfactants other than alkyl polyglycosides and alkoxylated non-ionic surfactants.

Perfume

The composition comprises a perfume formulation. The perfume formulation is a mixture of odorant perfume raw materials, such as aromatic natural oils and aromatic chemicals, which taken together form a complex scent that delivers a number of benefits. These benefits may include the coverage of product base odor, scenting the product itself, and lingering scent radiating from the surface into the air after cleaning. When the composition is sprayed, the benefit may also include the delivery of scent to the air when spraying the composition on a surface, and the delivery of scent to the air while wiping the composition on the surface. The perfume formulation may comprise at least 3, at least 5, at least 7, at least 11, or at least 15 perfume raw materials.

The perfume raw materials of the perfume formulation comprise at most 50%, or at most 40%, or at most 30%, for example from 0% to 20%, or from 0.01% to 10%, or from 0.02% to 5%, per weight of perfume raw materials comprising an α, β-unsaturated aldehyde function, an α, β-unsaturated ketone function, and/or an ester function.

For the purpose of the disclosure, an aromatic aldehyde/ketone wherein the aromatic ring is adjacent to the aldehyde or ketone group (e.g. anisic aldehyde or methyl 0-naphthyl ketone) is considered as an α, β-unsaturated aldehyde/ketone.

The perfume raw materials of the perfume may comprise at most 50%, or at most 40%, or at most 30% for example from 0% to 20%, or from 0.01% to 10%, or from 0.02% to 5% per weight of perfume raw materials selected from benzyl acetate, methyl salicylate, allyl amyl glycolate, benzyl propionate, pomarose, methyl dihydrojasmonate, heliotropin, anisic aldehyde, delta damascone, amyl butyrate, iso-amyl iso-butyrate, b-ionone, carvone, iso-butyl iso butanoate, methyl b-naphtyl ketone, citronellyl butyrate, iso-propyl miristate.

Limiting the percentage of perfume raw materials comprising α, β-unsaturated aldehyde function, an α, β-unsaturated ketone function, and/or an ester function could improve the stability of the composition.

The perfume raw materials of the perfume may comprise at least 20% per weight, in particular at least 30%, or at least 40%, or at least 50%, or at least 60%, or at least 70% for example from 80% to 100%, or from 90% to 99.9% per weight of perfume raw materials comprising an α, β-saturated aldehyde function, an α, β-saturated ketone function, an alcohol function, an ether function, a nitrile function, and/or being a terpene.

For the purpose of the disclosure an α, β-saturated aldehyde function is an aldehyde function without unsaturation in the α or β position.

For the purpose of the disclosure an α, β-saturated ketone function is a ketone function without unsaturation in the α or β position.

The perfume raw materials of the perfume may comprise at least 20% per weight, in particular at least 30%, or at least 40%, or at least 50%, or at least 60%, or at least 70% for example from 80% to 100%, or from 90% to 99.9% per weight of perfume raw materials which do not comprise α, β-unsaturated aldehyde function, an α, 0-unsaturated ketone function, and/or an ester function.

The perfume raw materials of the perfume formulation may comprise at least 20% per weight, in particular at least 30%, or at least 40%, or at least 50%, or at least 60%, or at least 70% for example from 80% to 100%, or from 90% to 99.9% per weight of perfume raw materials which comprise α, β-saturated aldehyde function, an α, β-saturated ketone function, an alcohol function, an ether function, a nitrile function, and/or are a terpene and which do not comprise an α, β-unsaturated aldehyde function, an α, β-unsaturated ketone function, and/or an ester function.

The perfume raw materials of the perfume formulation may comprise at least 20% per weight, in particular at least 30%, or at least 40%, or at least 50%, or at least 60%, or at least 70% for example from 80% to 100%, or from 90% to 99.9% per weight of perfume raw materials selected from d-muscenone 1, ambrox, polysantol, phenylethyl dimethyl carbinol, hydroxycitronellal, undecavertol, citronellol, linalool, p-cresyl methyl ether, cis-3-hexenol, clonal, limonene, tobacarol 2, tobacarol 3, tobacarol 1, b-naphthyl methyl ether.

The perfume may be comprised in one or more perfume delivery systems. The perfume delivery system may comprise neat perfume, perfume microcapsules, pro-perfumes, polymer particles, functionalized silicones, polymer assisted delivery, molecule assisted delivery, fiber assisted delivery, amine assisted delivery, cyclodextrins, starch encapsulated accord, zeolite and inorganic carrier, and mixtures thereof. One or more of the perfume delivery system may comprise the preferred raw perfume material of the disclosure as defined above. Perfume delivery technologies, methods of making certain perfume delivery technologies and the uses of such perfume delivery technologies are disclosed in US 2007/0275866 A1, US 2004/0110648 A1, US 2004/0092414 A1, 2004/0091445 A1, 2004/0087476 A1, U.S. Pat. Nos. 6,531,444, 6,024,943, 6,042,792, 6,051,540, 4,540,721, and 4,973,422. Preferably, the perfume is in the form of free perfume.

The composition comprises from 0.1% to 1%, or from 0.1% to 0.8%, or even from 0.2% to 0.5%, by weight of perfume.

The composition may comprise an acid and/or a base to adjust pH as appropriate.

A suitable acid for use herein is an organic and/or an inorganic acid. A preferred organic acid for use herein has a pKa of less than 6. A suitable organic acid is selected from the group consisting of citric acid, lactic acid, formic acid, glycolic acid, succinic acid, glutaric acid and adipic acid and a mixture thereof. A suitable inorganic acid is selected from the group consisting hydrochloric acid, sulphuric acid, phosphoric acid and a mixture thereof. A typical level of such an acid, when present, is of from 0.5% to 5%, from 0.8% to 3%, or from 0.8% to 2% by weight of the total composition. Preferably, the composition of the disclosure comprises from 0.5 to 2% by weight of the composition of citric acid.

A suitable base to be used herein is an organic and/or inorganic base. Suitable bases for use herein are the caustic alkalis, such as sodium hydroxide, potassium hydroxide and/or lithium hydroxide, and/or the alkali metal oxides such, as sodium and/or potassium oxide or mixtures thereof. A preferred base is a caustic alkali, more preferably sodium hydroxide and/or potassium hydroxide. Other suitable bases include ammonia. Typical levels of such bases, when present, are of from 0.01% to 1%, or from 0.1% to 0.5%. Sodium hydroxide is the preferred base for use herein.

Antimicrobial Agent

The composition may comprise antimicrobial agent or mixtures thereof.

The composition may comprise from 0.01 to 0.3%, or from 0.02 to 0.2%, by weight of the composition of an antibacterial agent. The antibacterial agent may comprise a salt of quaternium ammonium chloride.

Such antimicrobial agents are typically stable in the composition.

Other Ingredients

The composition may further include any suitable ingredients such as builders, chelants, polymers, preservative, hydrotropes, stabilisers, radical scavengers, bleaches, bleaches activators, soil suspenders, anti-dusting agent, dispersant, pigments, silicones, abrasives, dye transfer agent, brighteners, dye transfer inhibitor, thickener, fatty acid, branched fatty alcohol, and/or dye.

The composition may have a viscosity at shear rate 10 $s^{-1}$ of mPa·s or greater, more preferably of from 1 to 20.000 mPa·s, or from 1.5 to 100 mPa·s, or from 1.5 to 30 mPa·s, or from 2 to 10 mPa·s, or from 2.5 to 5 mPa·s at 20° C. when measured with a DHR1 rheometer (TA instruments) using a 2° 40 mm diameter cone/plate geometry, with a shear rate ramp procedure from 1 to 1000 $s^1$.

The pH of the composition according to the present disclosure may be from 1 to 6, or from 2 to 5 or preferably from 2 to 4.

A preferred composition comprises:

a) from about 0.5 to 4% by weight of the composition of the alkyl polyglycoside, preferably an alkyl polyglucoside, more preferably a C8-10 alkyl polyglucoside;
b) from about 0.01 to 1% by weight of the composition of the secondary surfactant, preferably the secondary surfactant is an alcohol ethoxylated; and
c) from about 0.1 to 1% by weight of the composition of the perfume.

A preferred composition comprises:

a) from about 0.5 to 2% by weight of the composition of the alkyl polyglycoside, preferably an alkyl polyglucoside, more preferably a C8-10 alkyl polyglucoside;
b) from about 0.05 to 0.5% by weight of the composition of the secondary surfactant, and the secondary surfactant comprises an alcohol ethoxylated; and
c) from about 0.1 to 0.5% by weight of the composition of the perfume.

A preferred composition comprises:

a) from about 0.5 to 2% by weight of the composition of the alkyl polyglycoside, preferably an alkyl polyglucoside, more preferably a C8-10 alkyl polyglucoside;
b) from about 0.05 to 0.3% by weight of the composition of the secondary surfactant, and the secondary surfactant comprises an alcohol ethoxylated;
c) from about 0.1 to 0.5% by weight of the composition of the perfume; and
d) from 0.1 to 3% by weight of the composition of an acid, preferably citric acid; and
e) from 0.05 to 1% by weight of the composition of a base, preferably sodium hydroxide.

A preferred composition comprises:

a) from about 0.5 to 2% by weight of the composition of the alkyl polyglycoside, preferably an alkyl polyglucoside, more preferably a C8-10 alkyl polyglucoside;
b) from about 0.05 to 0.3% by weight of the composition of the secondary surfactant, and the secondary surfactant comprises an alcohol ethoxylated;
c) from about 0.1 to 0.5% by weight of the composition of the perfume;
d) from about 0.1 to 0.5% by weight of the composition of an antimicrobial agent, preferably a salt of a quaternium ammonium chloride; and optionally
e) from about 0.1 to 0.5% by weight of the composition of a glycol solvent, preferably propylene glycol n-butyl ether.

The composition may be packaged in a variety of suitable detergent packaging known to those skilled in the art. The compositions can be packaged in conventional detergent plastic bottles. Preferably the composition is packaged in a spray dispenser, such as a trigger spray dispenser or pump spray dispenser. In one preferred embodiment the compositions herein may be packaged in manually or electrically operated spray dispensing containers. The container may be made of synthetic organic polymeric plastic materials. The composition may be in compacted form, and may be suitable to be diluted, for example 15 times before use.

Indeed, said spray-type dispensers allow to uniformly apply to a relatively large area of a surface to be cleaned the composition. Such spray-type dispensers are particularly suitable to clean inclined or vertical surfaces. Suitable spray-type dispensers to be used according to the present disclosure include manually operated foam trigger type dispensers sold for example by Specialty Packaging Products, Inc. or Continental Sprayers, Inc. These types of dispensers are disclosed, for instance, in U.S. Pat. No. 4,701,311 to Dunnining et al. and U.S. Pat. Nos. 4,646,973 and 4,538,745 both to Focarracci. Particularly preferred to be used herein are spray-type dispensers such as T 8500® commercially available from Continental Spray International or T 8100® commercially available from Canyon, Northern Ireland. In such a dispenser, the liquid composition is divided in fine liquid droplets resulting in a spray that is directed onto the surface to be treated. Indeed, in such a spray-type dispenser the composition contained in the body of said dispenser is directed through the spray-type dispenser head via energy communicated to a pumping mechanism by the user as said user activates said pumping mechanism. More particularly, in said spray-type dispenser head the composition is forced against an obstacle, e.g., a grid or a cone or the like, thereby providing shocks to help atomise the liquid composition, i.e., to help the formation of liquid droplets.

Method of Cleaning a Surface:

The preferred method of cleaning comprises the steps of:

a) contacting the surface with the composition of the present disclosure;

b) wiping the surface.

Preferably, the method of the disclosure does not require rinsing.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

EXAMPLES

The following examples will further illustrate the compositions and methods of the present disclosure.

Examples 1-3

Examples 1 to 3 are hard surface cleaner compositions. Those compositions are stable, provide good cleaning performance, good shine to the surface and preserve the surface safety of the surface to be cleaned.

The compositions of examples 1-3 are prepared by mixing the corresponding ingredients.

| Ingredient | Example 1 | Example 2 | Example 3 |
|---|---|---|---|
| Alkyl polyglucoside (1) | 1 | 0 | 1 |
| Nonionic surfactant (2) | 0 | 1 | 0.2 |
| Sodium hydroxide (3) | 0.3 | 0.3 | 0.3 |
| Citric acid (4) | 1.7 | 1.7 | 1.7 |
| Perfume | 0.22 | 0.22 | 0.22 |
| Dye | 0.0062 | 0.0062 | 0.0062 |
| Water | qsp | qsp | qsp |
| Cleaning* | 28 | 35 | 47 |
| Shine | 0.8 | 5.6 | 0.9 |
| Stability** | fail | pass | pass |

(1) C8-10 alkyl polyglucoside, Triton CG50 (DOW)

(2) Lialet 111-8, fatty alcohol polyethyleneglycol ether, C11 (Sasol)

(3) Sodium hydroxide (Solvay S.A.)

(4) Citric acid, JUNGBUNZLAUER

*The cleaning index is reported versus a reference of 100

**The stability of the compositions was measured at the following storage conditions: 50° C. for 10 days and 5° C. for 10 days.

In view of these results, the composition of Example 3 according to the disclosure provides the best shine and cleaning benefit while ensuring product stability.

Test Methods

Neat Cleaning Performance Test Method

The cleaning performance is evaluated by the following test method:

Bath tiles (ceramic, enamel or stainless steel) are prepared by applying to them a representative grease- or grease/particulate-artificial soil followed by ageing (30 min at 140° C.) of the soiled tiles and cooling and/or drying for 20 hours at 20° C. The test composition is evaluated by applying a small amount of product (e.g., 5 ml) to a sponge that has been previously rinsed a squeezed (weight of the sponge after squeezing 15-20 g). The soiled tiles are placed on a sheen machine, as well as the sponges, which measures the number of cycles required until the tile is 100% at a frequency of 20 cycles per minute. Before starting the cycles, the counter is set to zero. The cleaning performance is evaluated by measuring the number of cycles needed to get a clean surface versus a reference. The result, i.e., the number of cycles, of the test composition is compared against the result of a reference composition.

Shine test under neat conditions

The shine test is done with the black glossy ceramic tiles which are neat and cleaned with the test composition. Results are analysed by using grading described below.

Grading in absolute scale:

0=as new/no streaks and/or film

1=very slight streaks and/or film

2=slight streaks and/or film

3=slight to moderate streaks and/or film

4=moderate streaks and/or film

5=moderate/heavy streaks and/or film

6=heavy streaks and/or film.

Unless otherwise specified, percentages and ratio refer to weight percentage and weight ratio.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any disclosure disclosed or claimed herein or that it alone, or in any combination with any other reference or references, teaches, suggests or discloses any such disclosure. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A hard surface cleaning composition comprising:

a surfactant system comprising a primary surfactant comprising an alkyl polyglycoside and a secondary surfactant;

a perfume;

a biocidal compound comprising a quaternary ammonium compound; and water, wherein:

the primary and secondary surfactant are present in a weight ratio of at least about 3:1, the perfume and the surfactant system are present in a weight ratio of at least about 1:10, and the composition has a pH of from about 2 to about 6 as measured at 20° C.; and wherein the composition comprises:

from about 0.5 to about 4% by weight of the composition of the alkyl polyglycoside;

from about 0.01 to about 1% by weight of the composition of the secondary surfactant, wherein the secondary surfactant is an ethoxylated alcohol; and from about 0.1 to about 1% by weight of the composition of the perfume.

2. The composition according to claim 1, wherein:

the primary and secondary surfactant are present in a weight ratio of from about 4:1 to about 8:1;

the perfume and the surfactant are present in a weight ratio of from about 1:9 to about 1:3; and the composition has a pH of from about 2.5 to about 4.5 as measured at 20° C.

3. The composition according to claim 1, wherein the composition comprises:

from about 0.5 to about 2% by weight of the composition of the alkyl polyglycoside;

from about 0.05 to about 0.5% by weight of the composition of the secondary surfactant; and from about 0.1 to about 0.5% by weight of the composition of the perfume.

4. The composition according to claim 1, wherein the composition is an aqueous composition.

5. The composition according to claim 1, wherein the composition is free of anionic surfactant.

6. The composition according to claim 1, wherein the composition is free of glycol ether.

7. The composition according to claim 1, wherein the quaternary ammonium compound comprises a mixture of alkyl dimethyl benzyl ammonium chloride and alkyl dimethyl ethylbenzyl ammonium chloride.

8. The composition according to claim 1, wherein the composition further comprises an organic acid.

9. The composition according to claim 1, wherein the composition further comprises citric acid.

10. A method of treating a hard surface comprising the step of:

a) contacting the surface with the composition according to claim 1; and b) wiping the surface without previously rinsing it.

* * * * *